(12) United States Patent
Jones et al.

(10) Patent No.: US 8,244,808 B2
(45) Date of Patent: Aug. 14, 2012

(54) INTEGRATED NETWORK AND APPLICATION SESSION ESTABLISHMENT

(75) Inventors: David Jones, Seattle, WA (US); Eliot J. Flannery, Seattle, WA (US); Todd R. Manion, Redmond, WA (US); Gursharan Sidhu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 11/474,721

(22) Filed: Jun. 26, 2006

(65) Prior Publication Data

US 2007/0299914 A1 Dec. 27, 2007

(51) Int. Cl.
*G06F 15/16* (2006.01)
*G06F 17/00* (2006.01)

(52) U.S. Cl. .......................... 709/205; 715/238

(58) Field of Classification Search .............. 709/204, 709/205, 245, 227; 715/738
See application file for complete search history.

(56) References Cited

U.S. PATENT DOCUMENTS

| | | | |
|---|---|---|---|
| 5,941,945 A * | 8/1999 | Aditham et al. | 709/205 |
| 6,286,087 B1 * | 9/2001 | Ito et al. | 711/164 |
| 6,289,333 B1 * | 9/2001 | Jawahar et al. | 1/1 |
| 6,378,001 B1 * | 4/2002 | Aditham et al. | 719/313 |
| 6,732,145 B1 * | 5/2004 | Aravamudan et al. | 709/204 |
| 7,007,235 B1 * | 2/2006 | Hussein et al. | 715/751 |
| 7,024,451 B2 * | 4/2006 | Jorgenson | 709/203 |
| 7,162,699 B1 * | 1/2007 | Pena-Mora et al. | 715/751 |
| 7,174,364 B1 * | 2/2007 | Aravamudan et al. | 709/203 |
| 7,191,217 B2 * | 3/2007 | Tanabe et al. | 709/205 |
| 7,299,403 B1 * | 11/2007 | Cleasby et al. | 715/738 |
| 7,472,352 B2 * | 12/2008 | Liversidge et al. | 715/758 |
| 2002/0076025 A1 * | 6/2002 | Liversidge et al. | 379/202.01 |
| 2002/0078150 A1 * | 6/2002 | Thompson et al. | 709/204 |
| 2003/0163716 A1 * | 8/2003 | Robins et al. | 713/193 |
| 2003/0195932 A1 * | 10/2003 | Tanabe et al. | 709/205 |
| 2004/0141472 A1 * | 7/2004 | Haddad | 370/310 |
| 2004/0181416 A1 * | 9/2004 | Lee et al. | 705/1 |
| 2004/0202303 A1 * | 10/2004 | Costa-Requena et al. | 379/205.01 |
| 2004/0215784 A1 * | 10/2004 | Qi et al. | 709/227 |
| 2005/0149364 A1 * | 7/2005 | Ombrellaro | 705/3 |
| 2005/0179541 A1 * | 8/2005 | Wolfe | 340/539.22 |
| 2005/0216848 A1 * | 9/2005 | Thompson et al. | 715/753 |
| 2005/0289471 A1 * | 12/2005 | Thompson et al. | 715/751 |
| 2006/0010251 A1 * | 1/2006 | Mrsic-Flogel et al. | 709/245 |
| 2006/0184886 A1 * | 8/2006 | Chung et al. | 715/758 |
| 2007/0005695 A1 * | 1/2007 | Chen et al. | 709/204 |
| 2007/0106727 A1 * | 5/2007 | Mainard | 709/205 |
| 2007/0185959 A1 * | 8/2007 | Huck et al. | 709/204 |
| 2007/0192410 A1 * | 8/2007 | Liversidge et al. | 709/204 |
| 2008/0215682 A1 * | 9/2008 | Vilis | 709/204 |

OTHER PUBLICATIONS

Sandro Rafaeli and David Hutchison, A Multimedia Session Manager Service for the Collaborative Browsing System, Jan. 1, 2000, Springer Berlin / Heidelberg, Book Series Lecture Notes in Computer Science, pp. 23-33.*

* cited by examiner

*Primary Examiner* — Firmin Backer
*Assistant Examiner* — Michael A Chambers (57) ABSTRACT

A session manager recognizes the creation of a new collaboration session and creates a new network connection to host the collaboration session using information about the new collaboration session. More specifically, an identifier for the new host network connection is based on the name given to the collaboration session. In this way, other computing devices can discover existing collaboration sessions by scanning the identifiers of existing network connections without actually having to connect to the available networks first.

20 Claims, 8 Drawing Sheets

INTEGRATED NETWORK AND APPLICATION SESSION ESTABLISHMENT

BACKGROUND

People are always in search of new, simple ways to collaborate on projects. For example, businesses often gather their employees and colleagues for meetings, presentations, seminars, and the like. Often there is a desire for those gathered to simultaneously view or access the same digital content, such as data files or presentation materials. Some newer technologies support groups of people collaborating in such a manner. Some collaboration software enables individual users to join "collaboration sessions" in which each joined user can view the same presentation on a networked computing device. However, joining such a session can be a challenge for those that are not already connected to the network on which the session is occurring. Often there are both intentional and unintentional hurdles to connecting to a network.

Intentional hurdles may include a reluctance or outright opposition to providing users with information necessary to connect to the network. For instance, the user may not have an authorized account or the proper encryption codes to join an enterprise network. The host company or entity may not make such information available to temporary or visiting users, thus creating a barrier to network access.

Unintentional hurdles may include simply a user's lack of sufficient knowledge of how to make a network connection. For example, it is certainly true that even with the appropriate authentication or access information, many computer users still lack the skill necessary to connect a computing device to a network. Sometimes simply the fear of "messing something up" prevents ordinary computer users from attempting to alter their network settings.

A simple and intuitive mechanism for creating or joining a networked collaboration session has eluded those skilled in the art, until now.

SUMMARY

The invention is directed at integrating the process of creating a network connection with the process of initiating or joining a collaboration session. Briefly stated, techniques and mechanisms are provided for recognizing the creation of a new collaboration session and creating a new network connection to host the collaboration session using information about the new collaboration session in a predictable manner. More specifically, an identifier for the new host network connection is based on the name given to the collaboration session. In this way, other computing devices can discover existing collaboration sessions by scanning the identifiers of existing network connections without actually having to connect to the available networks first.

BRIEF DESCRIPTION OF THE DRAWINGS

Many of the attendant advantages of this invention will become more readily appreciated as the same becomes better understood by reference to the following detailed description, when taken in conjunction with the accompanying drawings, briefly described here.

Embodiments of the invention will now be described in detail with reference to these Figures in which like numerals refer to like elements throughout.

DETAILED DESCRIPTION OF EMBODIMENTS

Various embodiments are described more fully below with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Generally stated, the described embodiments include mechanisms and techniques for automating the initiation of a network connection in conjunction with establishing or joining a collaboration session. Details about these illustrative mechanisms and techniques will now be described, with reference to the Figures.

Figure 1:
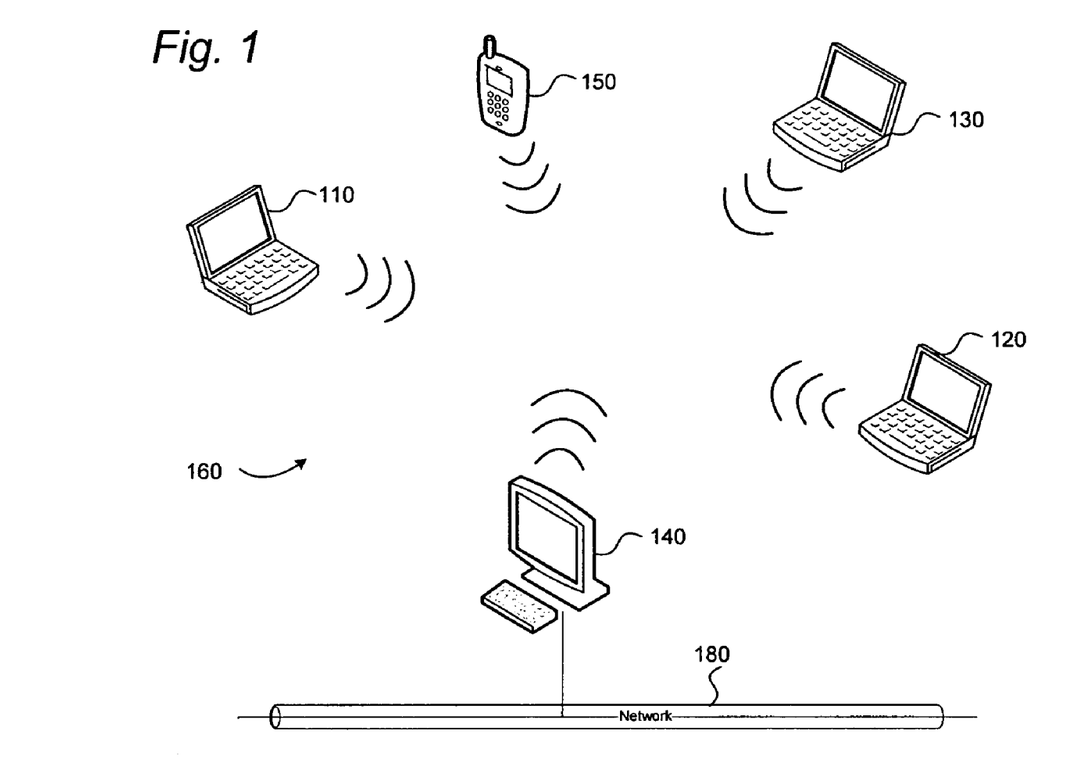
FIG. 1 is a functional block diagram of an ad-hoc network environment in which a collaboration session may be conducted, in accordance with implementations of the invention.

FIG. 1 is a functional block diagram of an ad-hoc network 160 in which a distributed application, such as a collaboration application, may execute, in accordance with implementations of the invention. The ad hoc network 160 includes a group of computing devices networked together in a peer-to-peer fashion. In this illustration, the group includes laptop computers (e.g., laptop 110, laptop 120, and laptop 130), a desktop computer 140, and a handheld mobile computing device 150. These computing devices are connected over an ad hoc network 160.

"Ad hoc" network refers to a network topology, especially one with wireless or temporary plug-in connections, in which some of the network devices are part of the network only for the duration of a communications session or, in the case of mobile or portable devices, while in some close proximity to the rest of the network. Commonly, ad hoc networks are established using wireless network adapters, such as those compatible with the IEEE 802.11 standards. Ad hoc network technologies enable the creation of very simple networks without a need for a router or other complex components common in larger or more elaborate networks. Ad hoc networks, especially wireless ad hoc networks, are well suited to the task of temporarily and easily interconnecting two or more computing devices.

One or more of the computing devices, such as the desktop computer 140, may additionally be connected to another network, such as wired Ethernet network 180. In some situations, a computing device may be initially connected to one network, such as the wired Ethernet network 180, and then be connected to the ad hoc network 160 either in addition to the other network or by first disconnecting from the other network.

In accordance with this embodiment, the several computing devices connected with the ad hoc network 160 are each executing an instance of a collaboration application that enables them to share resources in a communication experience. More specifically, the collaboration application, such as the illustrative example described below, may enable the several computing devices to simultaneously view or participate in a presentation or other application. In other words, the collaboration application may support the simultaneous viewing or sharing of another application, such as a presentation application or the like. In this way, the users of each of the computing devices connected to the ad hoc network 160 can view the same presentation as it is given. In addition, other resources, such as files, may be shared with the several computing devices using the collaboration application. These features make the collaboration application very useful in situations where groups of individuals wish to work together on documents or files, or perhaps view a presentation simultaneously.

In operation, typically one computing device, such as laptop 110, initiates a collaboration session. That device may then invite other computing devices, such as laptop 120, to join the session. Alternatively, if the user of the other laptop 120 knows the credentials or access information of the session (typically a session name and password), then the other laptop 120 can simply join the session. Thus, by connecting to the ad hoc network 160, each of the computing devices can join the same collaboration session and have access to common resources.

Joining the collaboration session relies on a network connection being present. And although ad hoc network technology greatly simplifies establishing a network connection, the technology still involves establishing a network, and as such still gives many users pause. To that end, the particular embodiments described automate and integrate the processes of establishing or joining the ad hoc network 160 and establishing or joining a collaboration session. In this manner, users of the several computing devices that wish to join a collaboration session can do so with little or no knowledge about the ad hoc network 160 configuration.

Figure 2:
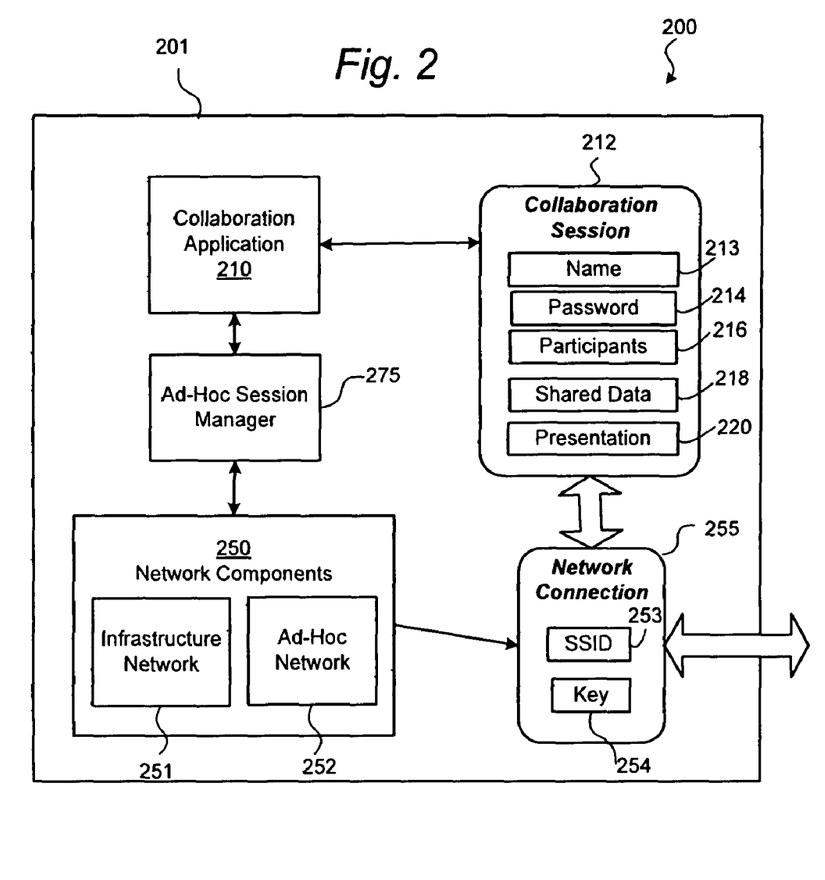
FIG. 2 is a block diagram generally illustrating functional components of a system implementing one embodiment of the present invention.

FIG. 2 is a block diagram generally illustrating functional components of a system 200 implementing one embodiment of the present invention. Each of the components may be implemented in software, firmware, or possibly hardware. The components illustrated in FIG. 2 are representative components that embody functionality for performing various operations of this embodiment. In other embodiments, the functionality embodied in the components described could alternatively be implemented with different components, combined into fewer components, or distributed among additional components without deviating from the spirit of these teachings.

In this implementation, the system 200 includes a collaboration application 210 and network components 250 residing on a host computing device 201. The network components 250 may include various drivers and other components for establishing a network connection, such as network connection 255. The network components 250 may include drivers for hardware, such as a network adapter driver, and drivers for other functions, such as a transport protocol, encryption, and the like. The network components 250 may include different components for different types of networks, such as components for an infrastructure network 251 and for an ad hoc network 252, although there may be significant overlap between the components of the different network types.

The collaboration application 210 is an application for establishing a peer-to-peer session in which multiple users can interact and collaborate on a common set of resources. More specifically, the collaboration application 210 is used to create a collaboration session 212, which supports peer-to-peer interaction between multiple users for a particular instance, such as one particular meeting or the like. The collaboration session 212 includes several properties that define which users can interact with the session 212 and how the interaction occurs. More specifically, the collaboration session 212 includes a name 213 to uniquely identify the session 212, and a password 214 that secures access to the session 212. Users wishing to join the session 212 supply the name 213 and password 214.

The collaboration session 212 may also include an element that specifies the participants 216 that are currently involved in the session. For example, there may be a presenter and other meeting attendees. Each of those users would be identified as a participant 216. There may also be shared data 218, such as documents, presentations, or other files. The shared data 218 represents files or other information that has been associated with the collaboration session 212 for use or access by all the participants 216. The collaboration session 212 also identifies a presentation 220, which may be an output or display generated by an application executing on the host computing device of the current "presenter." Any one of the participants 216 may be acting in the role of the presenter.

In this embodiment, a session manager 275 is included to facilitate the creation of the network connection 255 to support the collaboration session 212. More specifically, the session manager 275 interacts with the collaboration application 210 and the network components 250 to create the network connection 255 when the collaboration session 212 is created.

The collaboration session 212 may either be created to initiate a session or meeting, or it may be created for the purpose of joining another collaboration session created on a different computing device. In other words, an instance of a collaboration session would exist on the computing device of each participant 216. When the collaboration session 212 is created, the session manager 275 causes an instance of the appropriate network components 250 to be created as the network connection 255. In this embodiment, the network connection 255 is created using the ad hoc network components 250.

The network connection 255 includes several parameters or properties that are of interest to other applications or computing systems that attempt to communicate using the network connection 255. Two notable parameters are a name (e.g., a Service Set IDentifier "SSID" 253) and a key 254. The SSID 253 is a unique identifier for the network connection 255 that distinguishes it from other network sessions that may be present in the network environment. The SSID 253 is merely one particular way of naming the network connection 255, and many others are possible.

The key 254 is a cryptographic key used to secure the network connection 255. Cryptographic keys are known in the art and can be used with any one or more of various encryption techniques, such as Wired Equivalent Privacy (WEP), Wi-Fi Protected Access (WPA), or the like. As described in more detail below, the SSID 253 and the key 254 are derived from the name 213 and password 214 of the collaboration session 212, respectively, in this embodiment.

The specific techniques and processes employed by the session manager 275, in cooperation with the collaboration application 210 and the network components 250, to create the network connection 255 in conjunction with the collaboration session 212 are described below.

Figure 3:
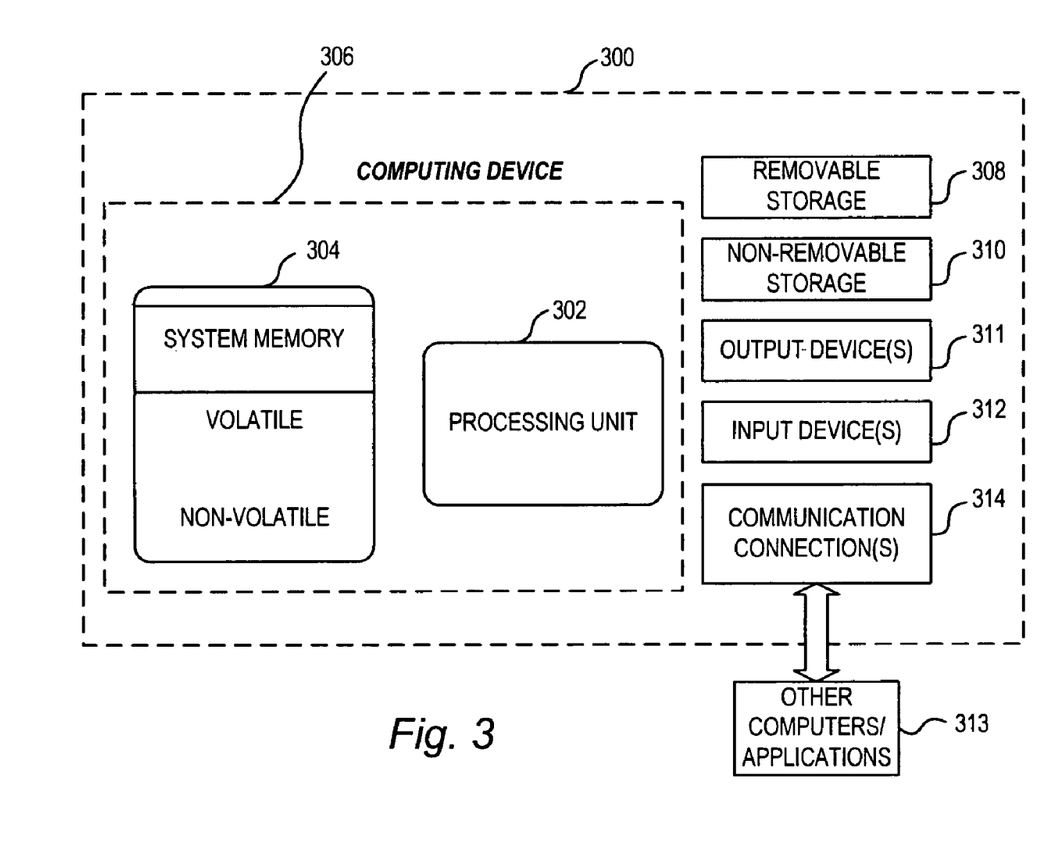
FIG. 3 is a functional block diagram of an exemplary computing device that may be used to implement one or more embodiments of the invention.

FIG. 3 is a functional block diagram of an exemplary computing device 300 that may be used to implement one or more embodiments of the invention, such as the embodiments described below. The computing device 300, in one basic configuration, includes at least a processing unit 302 and memory 304. Depending on the exact configuration and type of computing device, memory 304 may be volatile (such as RAM), non-volatile (such as ROM, flash memory, etc.) or some combination of the two. This basic configuration is illustrated in FIG. 3 by dashed line 306.

Additionally, device 300 may also have other features and functionality. For example, device 300 may also include additional storage (removable and/or non-removable) including, but not limited to, magnetic or optical disks or tape. Such additional storage is illustrated in FIG. 3 by removable storage 308 and non-removable storage 310. Computer storage media includes volatile and nonvolatile, removable and non-removable media implemented in any method or technology for storage of information such as computer readable instructions, data structures, program modules or other data. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 300. Any such computer storage media may be part of device 300.

Computing device 300 includes one or more communication connections 314 that allow computing device 300 to communicate with one or more computers and/or applications 313. Device 300 may also have input device(s) 312 such as keyboard, mouse, pen, voice input device, touch input device, etc. Output device(s) 311 such as a monitor, speakers, printer, PDA, mobile phone, and other types of digital display devices may also be included. These devices are well known in the art and need not be discussed at length here.

The principles and concepts introduced above will now be described with reference to sample graphical displays that may be presented by a collaboration application, such as the one described above in conjunction with FIG. 2.

Figure 4:
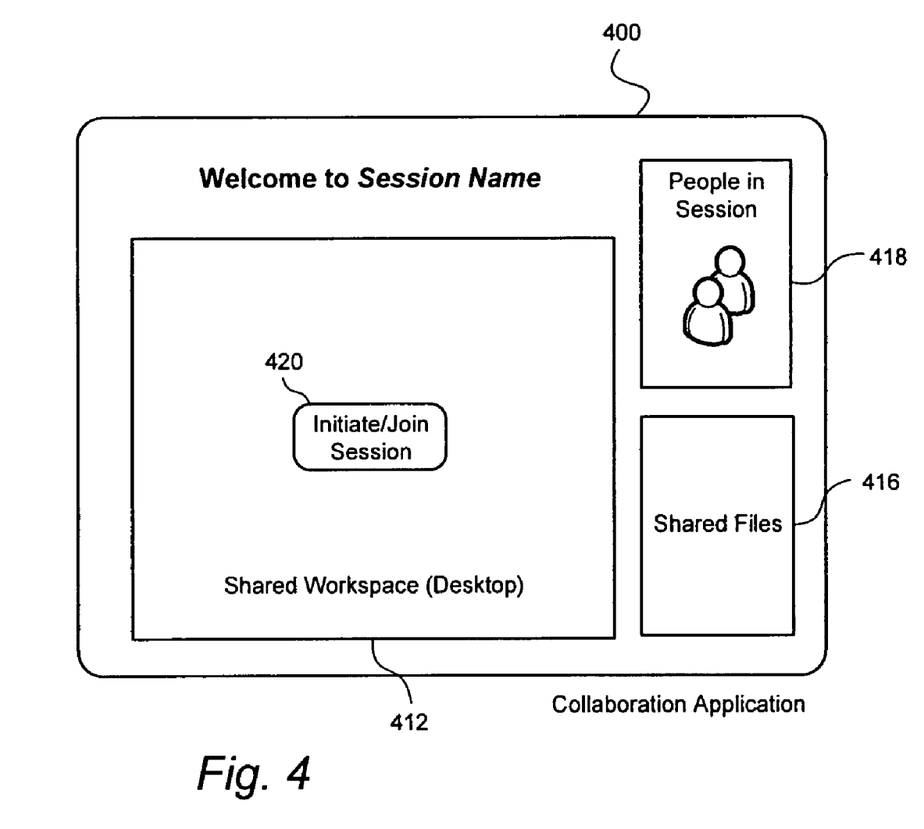
FIG. 4 is a graphical representations of a display that may be presented by one example of a collaboration application, in accordance with one implementation of the invention.

FIG. 4 is a graphical representation of a display 400 that may be presented by a collaboration application, such as the one described above. The display 400 includes a participants portion 418 identifies each of the users that have joined the session. Until the first session is created, the participants portion 418 may be empty or may display only the user that has initiated the collaboration application until the session is established.

The display 400 also includes a presentation portion 412, in which the presentation 220 (FIG. 2) may be displayed. As mentioned, the presentation portion 412 may be used to display a presentation or other visual output, such as the window of another executing application. In other words, the presentation portion 412 may be used to share one participant's desktop or application with all the other participants 418 that have joined the session.

The display 400 also includes a shared resources portion 416. The shared resources portion 416 may be used to share documents or other files among the participants of the session. For example, one user that has joined the session may share a file by dragging and dropping the file to the shared files portion 416. By so doing, the file would appear on the corresponding displays of each participant 418, and each participant 418 would have access to the file.

To begin a collaboration session, a user launches the collaboration application and is presented with the initial display 400. Clicking an initiate button 420 (or the like) causes the collaboration application to initialize a new collaboration session, such as the collaboration session 212 (FIG. 2). Doing so may transform the display 400 to an initialize session display 500, illustrated in FIG. 5.

Figure 5:
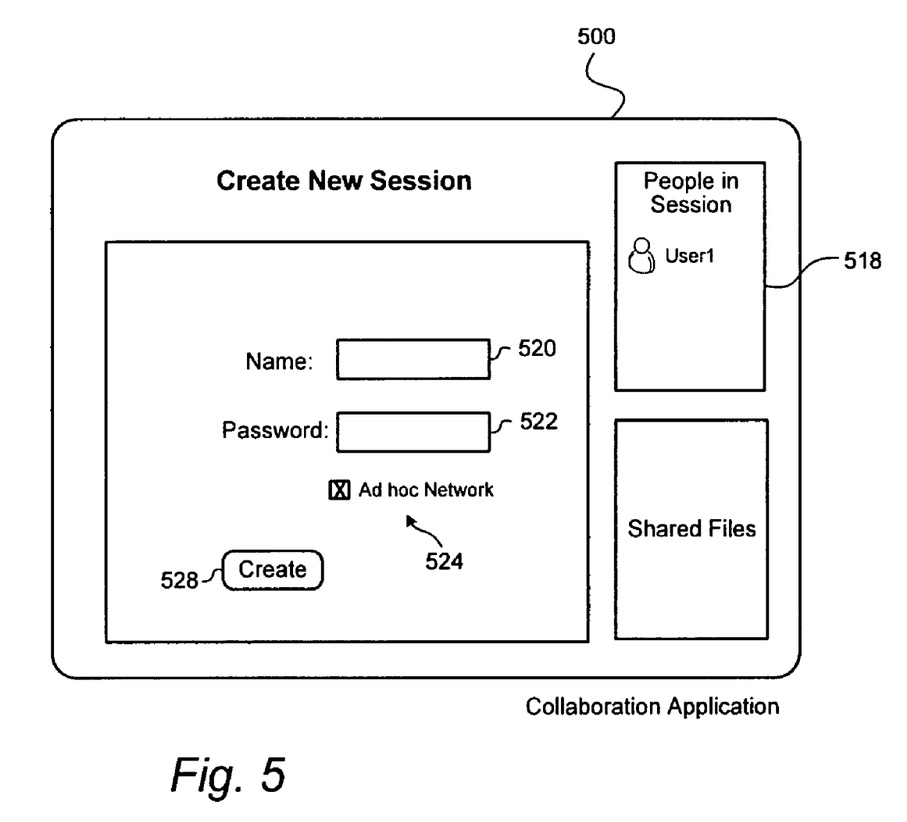
FIG. 5 is a graphical representations of another display that may be presented by one example of a collaboration application, in accordance with one implementation of the invention.

Turning now to FIG. 5, initializing a collaboration session begins by the collaboration application prompting the user for identification information. In this example, the initialize session display 500 allows the user to create a new collaboration session. In accordance with this implementation, creating the new session may involve as little as providing a name 520 for the session, and may also include providing a password 522. The name 520 identifies the session and distinguishes the session from other sessions that may possibly be occurring. The password 522 secures the session. The user may provide other potential participants with the password 522 offline, such as in person, through another communication channel, or the like.

A network field 524 allows the user to specify that the new session should be created on an ad hoc network so that other users can easily join. If the user leaves the network field 524 unchecked, the new session will be created using an existing or conventional network.

Referring now briefly to both FIGS. 2 and 5, clicking a create button 528 causes the new collaboration session 212 to be created. The name 213 of the session 212 is the name 520 provided by the user. The password 214 for the collaboration session 212 is the password 522 provided by the user. In addition, if the network field 524 is checked, the session manager 275 creates the network connection 255 with little or no further manual intervention.

In this particular example, the session manager 275 creates the SSID 253 for the network connection 255 based on the name 213 of the collaboration session 212. For example, the session manager 275 may prepend or append some special character, such as the "pipe" character '|', to the name 213 to form the SSID 253. Thus, if the name 213 were "session_1", the transformed name and SSID 253 would be "|session_1". Many other examples will become apparent to those skilled in the art. In essence, the SSID 253 is created based on the name 213 in some predictable manner, such as by transforming the name 213 with a known modification. The reason for this predictable transformation is to facilitate connecting to existing sessions, as is discussed below in conjunction with FIG. 6.

In like manner, the session manager 275 uses the password 214 to form the key 254. For instance, the session manager 275 may transform the password 214, or some predictable derivative of it, into a suitable hexadecimal value for use as the key 254. Again, the reason for basing the key 254 on the password 214 is to simplify the process of establishing a network connection and joining an existing session, as is discussed below.

Figure 6:
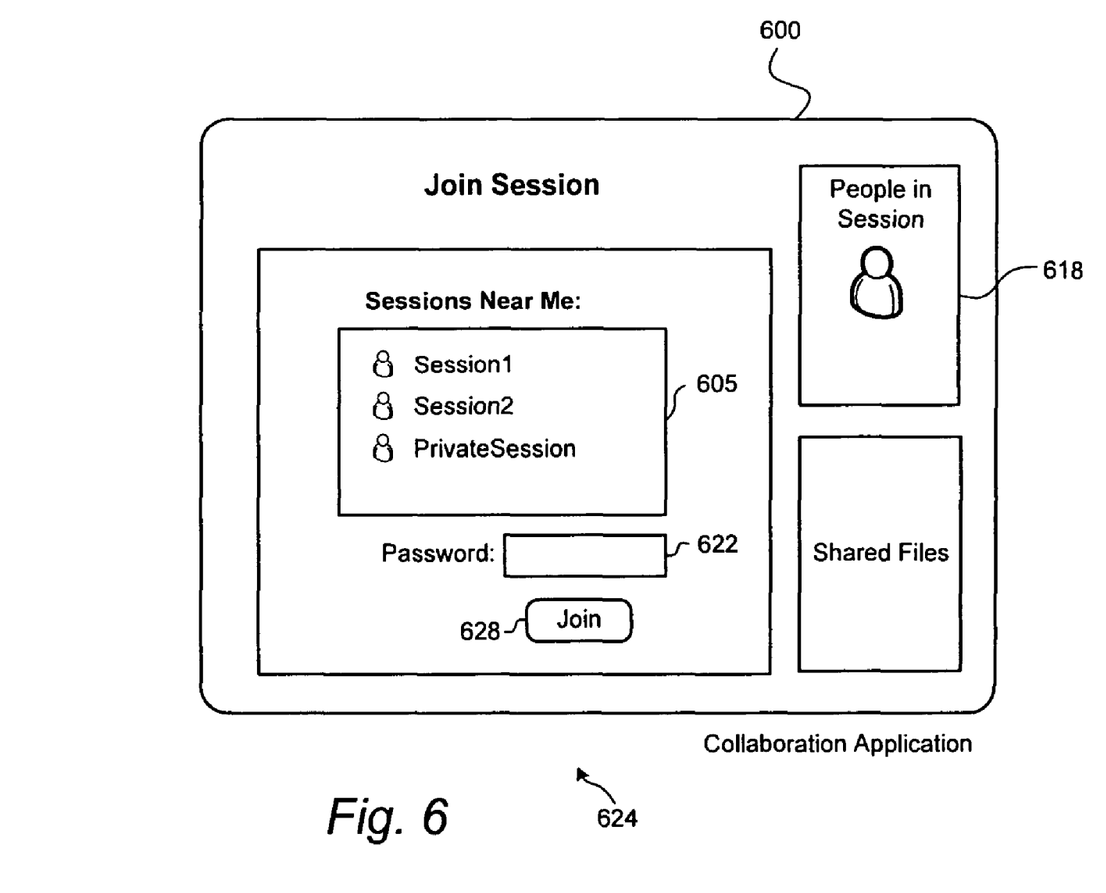
FIG. 6 is a graphical representations of another display that may be presented by one example of a collaboration application, in accordance with one embodiment of the invention.

Referring now to FIG. 6, illustrated is a graphical representation of a display 600 that may be rendered by a collaboration application for a user that desires to join an existing collaboration session. This display 600 also may have been reached from the initial display 400 described above. To begin, the user indicates to the collaboration application a desire to join a session. In response, the collaboration application presents display 600, which includes a listing 605 of existing collaboration sessions that may be joined. The listing 605 may be generated by scanning for any available networks, such as wireless ad hoc networks, that are named in accordance with the transformation described above. In other words, because new collaboration sessions are created on ad hoc networks that are named in a predictable way, it becomes simple to detect whether an available ad hoc network hosts a collaboration session that may be joined. Thus, the listing 605 is populated with the names of any ad hoc networks that are broadcasting in the area and whose names have been transformed in the manner described above. It will be appreciated that the un-transformed name will likely be presented in the listing 605 to avoid confusion.

The user may select one of the sessions on the listing 605 and attempt to join, such as by clicking a join button 628. The user may be prompted for a password 622 to enable access to the session. Providing the password serves two different but related functions in this implementation. The password 622 provided by the user must match the password 214 for the session 212 for the user to be granted access to the collaboration session. In addition, because the password 214 is used to derive the network key 254, the password 622 provided by the user must accurately match the session password 214 or the user will not even be able to connect to the network, thus providing a second layer of security.

Figure 7:
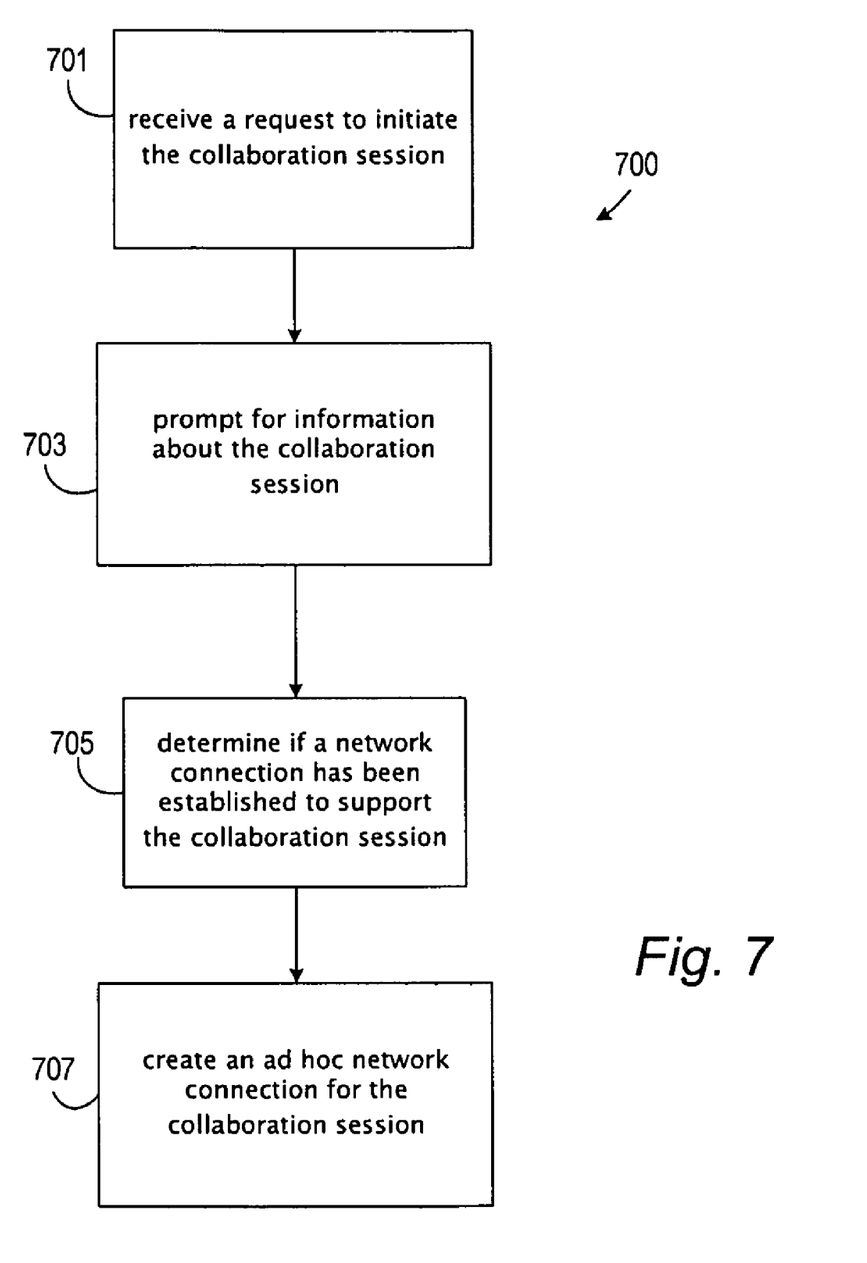
FIG. 7 is an operational flow diagram generally illustrating a process for initiating a collaboration session, in accordance with one embodiment of the invention.

FIG. 7 is an operational flow diagram generally illustrating a process 700 for initiating a collaboration session. The process 700 begins at step 701, where a request to initiate the collaboration session is received. The collaboration session enables a plurality of computing devices to simultaneously access resources.

At step 703, a user is prompted for information about the collaboration session. The information includes a name for the collaboration session. The name distinguishes the collaboration session from other collaboration sessions.

At step 705, it is determined if a network connection has been established to support the collaboration session. In one example, a determination is made whether an existing network connection should be used or if a new network connection should be used.

At step 707, if no network connection exists, an ad hoc network connection having a network connection identifier based on the name of the collaboration session is created. In one example, the network connection is assigned an SSID based on the name of the collaboration session.

Figure 8:
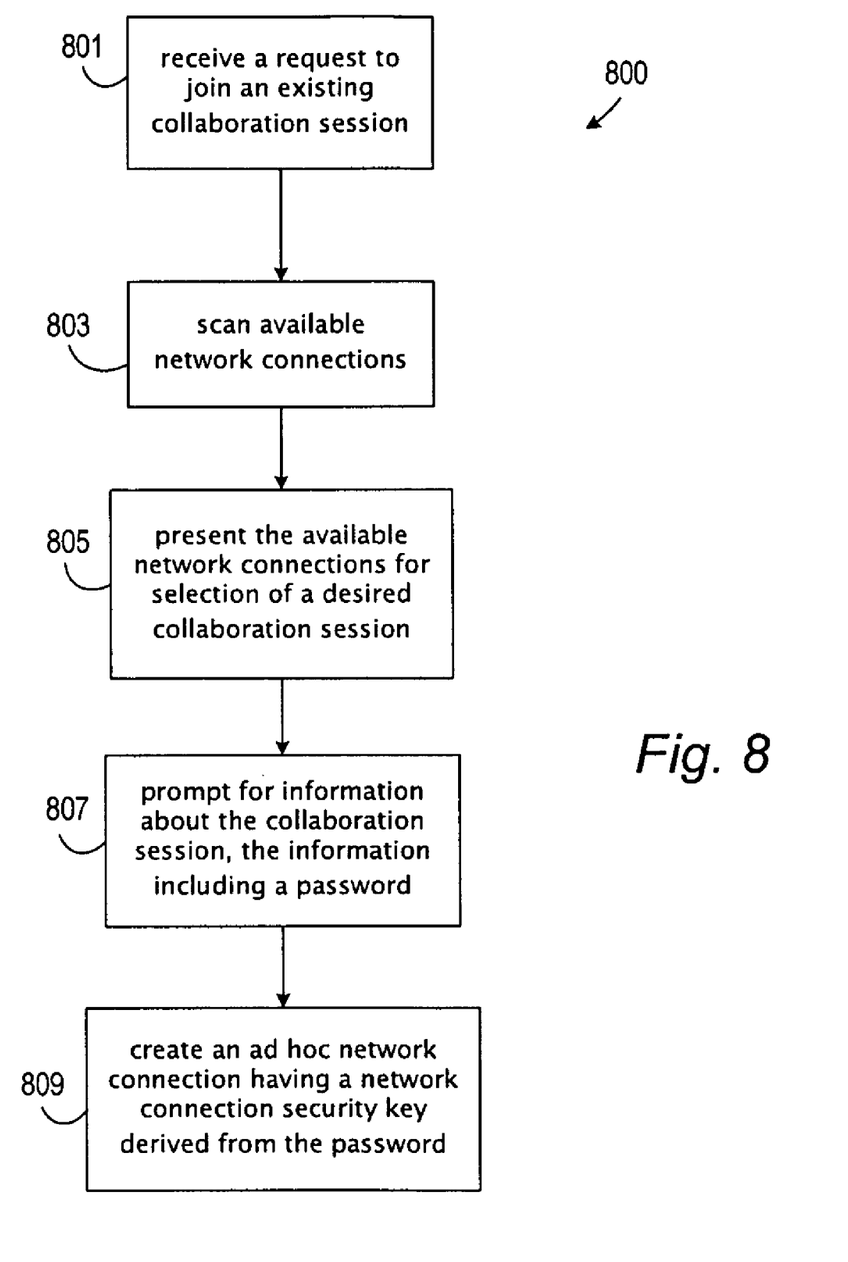
FIG. 8 is an operational flow diagram generally illustrating a process for joining an existing collaboration session, in accordance with one embodiment of the invention.

FIG. 8 is an operational flow diagram generally illustrating a process 800 for joining an existing collaboration session. The process 800 begins at step 801, where a request to join the existing collaboration session is received. The collaboration session enables a plurality of computing devices to simultaneously access resources.

At step 803, a scan is performed for available network connections that include an identifier indicating that the available network connections host a collaboration session. As discussed at length above, the identifier may be a network connection SSID that includes a known character or series of characters.

At step 805, the available network connections are presented to a user for selection of a desired collaboration session.

At step 807, in response to the selection of the desired collaboration session, a user is prompted for information about the collaboration session. The information includes a password that secures the collaboration session.

At step 809, an ad hoc network connection is created to host the collaboration session. The ad hoc network connection includes a security key derived from the password for the collaboration session.

In summary, the techniques and mechanisms described above enable a user to create a collaboration session with practically no knowledge of network configuration, and with as little input as providing a name and a password. An ad hoc network connection can then be made available that, by its nature, informs those in the area of the existence of the collaboration session on that network. Other users that desire to join the session will be presented with the collaboration sessions in the area that are available. By merely providing the password, the user is connected to the proper ad hoc network and to the session without ever manually configuring any network settings, thus greatly simplifying the process.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention

We claim:

1. A computer-readable storage medium that does not consist of a signal, the computer-readable storage medium storing computer-executable instructions that, when executed by a host computing device, cause the host computing device to perform a method for initiating a collaboration session, the computer-readable storage medium storing instructions for:

receiving, at the host computing device, a request from a user of the host computing device to initiate the collaboration session, wherein the host computing device includes a wireless adapter, and the request to initiate the collaboration session is received by a collaboration application hosted by the host computing device;

prompting, by the collaboration application, the user of the host computing device to provide a name and a password for the collaboration session;

establishing, by the collaboration application, the collaboration session on the host computing device, the collaboration session having the name provided by the user and being secured by the password provided by the user;

automatically configuring, by the collaboration application in conjunction with establishing the collaboration session, a wireless ad hoc network for a duration of the collaboration session using the wireless network adapter of the host computing device, the wireless ad hoc network configured to have a network connection identifier that includes the name of the collaboration session provided by the user and to be secured by the password for the collaboration session provided by the user, the wireless ad hoc network enabling other wireless computing devices in close proximity to the host computing device to connect to the host computing device via a wireless ad hoc network connection in peer-to-peer fashion without using a router;

inviting, by the collaboration application, one or more other wireless computing devices in close proximity the host computing device to join the collaboration session by:

sending the name and the password for the collaboration session to the one or more other wireless computing devices in close proximity to the host computing device through another communications channel, and broadcasting the network connection identifier of the wireless ad hoc network that includes the name of the collaboration session from the host computing device for enabling the one or more other wireless computing devices in close proximity to the host computing device to discover the network connection identifier of the wireless ad hoc network that includes the name of the collaboration session when scanning for available wireless networks; and joining, by the collaboration application, the one or more other wireless computing devices to the collaboration session on the host computing device when each of the one or more other wireless computing devices supplies the password for the collaboration session to connect to the wireless ad hoc network identified by the network identifier that includes the name of the collaboration session.

2. The computer-readable storage medium recited in claim 1, further storing instructions for creating a new collaboration session residing on the host computing device.

3. The computer-readable storage medium recited in claim 1, further storing instructions for joining an existing collaboration session residing on the host computing device.

4. The computer-readable storage medium recited in claim 1, further storing instructions for:

transforming the password for the collaboration session provided by the user into a security code;

configuring the wireless ad hoc network to be secured by the security code; and sending the security code to the other wireless devices in close proximity to the host computing device through the communications channel.

5. The computer-readable storage medium recited in claim 1, further storing instructions for:

scanning for available wireless networks that host existing collaboration sessions;

presenting a listing of the existing collaboration sessions generated from network connection identifiers of the available wireless networks; and in response to a selection of a desired collaboration session from the listing, joining the available wireless network hosting the desired collaboration session.

6. The computer-readable storage medium recited in claim 1, further storing instructions for:

providing the one or more wireless computing devices with access to a shared desktop.

7. The computer-readable storage medium recited in claim 6, further storing instructions for:

providing the one or more wireless computing devices with access to shared files.

8. The computer-readable storage medium recited in claim 4, wherein the wireless ad hoc network is secured by one of a Wired Equivalent Privacy (WEP) security code or a Wi-Fi Protected Access (WPA) security code derived from the password for the collaboration session provided by the user.

9. The computer-readable storage medium recited in claim 1, further storing instructions for disconnecting the host computing device from an existing wired network.

10. A computing device comprising:

a wireless adapter;

a processing unit for executing computer-executable instructions; and memory storing computer-executable instructions for:

receiving, at a collaboration application hosted by the computing device, a request from a user of the computing device to initiate a collaboration session;

prompting, by the collaboration application, the user of the host computing device to provide a name and a password for the collaboration session;

establishing, by the collaboration application, the collaboration session on the computing device, the collaboration session having the name provided by the user and being secured by the password provided by the user;

automatically configuring, by the collaboration application in conjunction with establishing the collaboration session, a wireless ad hoc network for a duration of the collaboration session using the wireless adapter of the computing device, the wireless ad hoc network configured to have a network connection identifier that includes the name of the collaboration session provided by the user and to be secured by the password for the collaboration session provided by the user, the wireless ad hoc network enabling other wireless computing devices in close proximity to the computing device to connect to the computing device via a wireless ad hoc network connection in peer-to-peer fashion without using a router;

inviting, by the collaboration application, one or more other wireless computing devices in close proximity the host computing device to join the collaboration session by:

sending the name and the password for the collaboration session to the one or more other wireless computing devices in close proximity to the computing device through another communications channel, and broadcasting the network connection identifier of the wireless ad hoc network that includes the name of the collaboration session from the computing device for enabling the one or more other wireless computing devices in close proximity to the computing device to discover the network connection identifier of the wireless ad hoc network that includes the name of the collaboration session when scanning for available wireless networks; and joining, by the collaboration application, the one or more other wireless computing devices to the collaboration session on the computing device when each of the one or more other wireless computing devices supplies the password for the collaboration session to connect to the wireless ad hoc network identified by the network connection identifier that includes the name of the collaboration session.

11. The computing device recited in claim 10, wherein the network connection identifier for the wireless ad hoc network includes one or more characters appended to the name of the collaboration session provided by the user.

12. The computing device recited in claim 10, the memory further storing instructions for:
   deriving a cryptographic value from the password for the collaboration session provided by the user;
   configuring the wireless ad hoc network to be secured by the cryptographic value; and
   sending the cryptographic value to the other wireless devices in close proximity to the host computing device through the communications channel.

13. The computing device recited in claim 10, the memory further storing instructions for:
   scanning for available wireless networks that host existing collaboration sessions.

14. The computing device recited in claim 13, wherein a network connection identifier of an available wireless network comprises a special character if the available wireless network is hosting an existing collaboration session.

15. The computing device recited in claim 10, the memory further storing instructions for:
   providing the one or more wireless computing devices with access to a shared desktop.

16. The computing device recited in claim 10, the memory further storing instructions for:
   providing the one or more wireless computing devices with access to shared files.

17. A computer-implemented method for initiating a collaboration session, the method comprising:
   receiving, at a host computing device, a request from a user of the host computing device to initiate the collaboration session, wherein the host computing device includes a wireless adapter, and the request to initiate the collaboration session is received by a collaboration application hosted by the host computing device;
   prompting, by the collaboration application, the user of the host computing device to provide a name and a password for the collaboration session;
   establishing, by the collaboration application, the collaboration session on the host computing device, the collaboration session having the name provided by the user and being secured by the password provided by the user;
   automatically configuring, by the collaboration application in conjunction with establishing the collaboration session, a wireless ad hoc network for a duration of the collaboration session using the wireless network adapter of the host computing device, the wireless ad hoc network configured to have a network connection identifier that includes the name of the collaboration session provided by the user and to be secured by the password for the collaboration session provided by the user, the wireless ad hoc network enabling other wireless computing devices in close proximity to the host computing device to connect to the host computing device via a wireless ad hoc network connection in peer-to-peer fashion without using a router;
   inviting, by the collaboration application, one or more other wireless computing devices in close proximity the host computing device to join the collaboration session by:
      sending the name and the password for the collaboration session to the one or more other wireless computing devices in close proximity to the host computing device through another communications channel, and
      broadcasting the network connection identifier of the wireless ad hoc network that includes the name of the collaboration session from the host computing device for enabling the one or more other wireless computing devices in close proximity to the host computing device to discover the network connection identifier of the wireless ad hoc network that includes the name of the collaboration session when scanning for available wireless networks; and
   joining, by the collaboration application, the one or more other wireless computing devices to the collaboration session on the host computing device when each of the one or more other wireless computing devices supplies the password for the collaboration session to connect to the wireless ad hoc network identified by the network identifier that includes the name of the collaboration session.

18. The method recited in claim 17, further comprising joining an existing collaboration session residing on the host computer.

19. The method recited in claim 17, further comprising providing the one or more other wireless computing devices with access to a shared desktop.

20. The method recited in claim 19, further comprising providing the one or more other wireless computing devices with access to shared files.

* * * * *